(12) United States Patent
Hoffmann

(10) Patent No.: US 6,719,481 B2
(45) Date of Patent: Apr. 13, 2004

(54) CONNECTION ELEMENT

(75) Inventor: Armin Hoffmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 41 days.

(21) Appl. No.: 10/032,673

(22) Filed: Oct. 25, 2001

(65) Prior Publication Data

US 2002/0054788 A1 May 9, 2002

(51) Int. Cl.7 ................................................. F16B 33/00
(52) U.S. Cl. ............................. 403/403; 403/3; 403/4; 403/13; 403/382
(58) Field of Search ..................... 403/24, 403, 13, 403/382, 3, 4

(56) References Cited

U.S. PATENT DOCUMENTS

| | | | | |
|---|---|---|---|---|
| 4,035,093 A | * | 7/1977 | Redshaw | 403/4 |
| 4,784,509 A | * | 11/1988 | Gozzano | 403/403 |
| 4,973,187 A | * | 11/1990 | Sauder | 403/403 |
| 6,192,645 B1 | * | 2/2001 | Benz et al. | 403/403 |
| 6,494,639 B1 | * | 12/2002 | Friend | 403/403 |

FOREIGN PATENT DOCUMENTS

DE  29704977 U1 * 5/1997 ........... F16B/00/00

* cited by examiner

Primary Examiner—Lynne H. Browne
Assistant Examiner—Ernesto Garcia
(74) Attorney, Agent, or Firm—Sidley Austin Brown & Wood, LLP

(57) ABSTRACT

A connection element for at least two mounting rails (1, 2, 30, 33, 38) and including a base member (4, 20, 28, 34) at least one attachment member having at least one connection opening (6, 39), and connection elements (7, 35, 36) for reasonably connecting the attachment member (5, 25, 31, 32, 37) with the base member (4, 20, 28, 34).

6 Claims, 8 Drawing Sheets

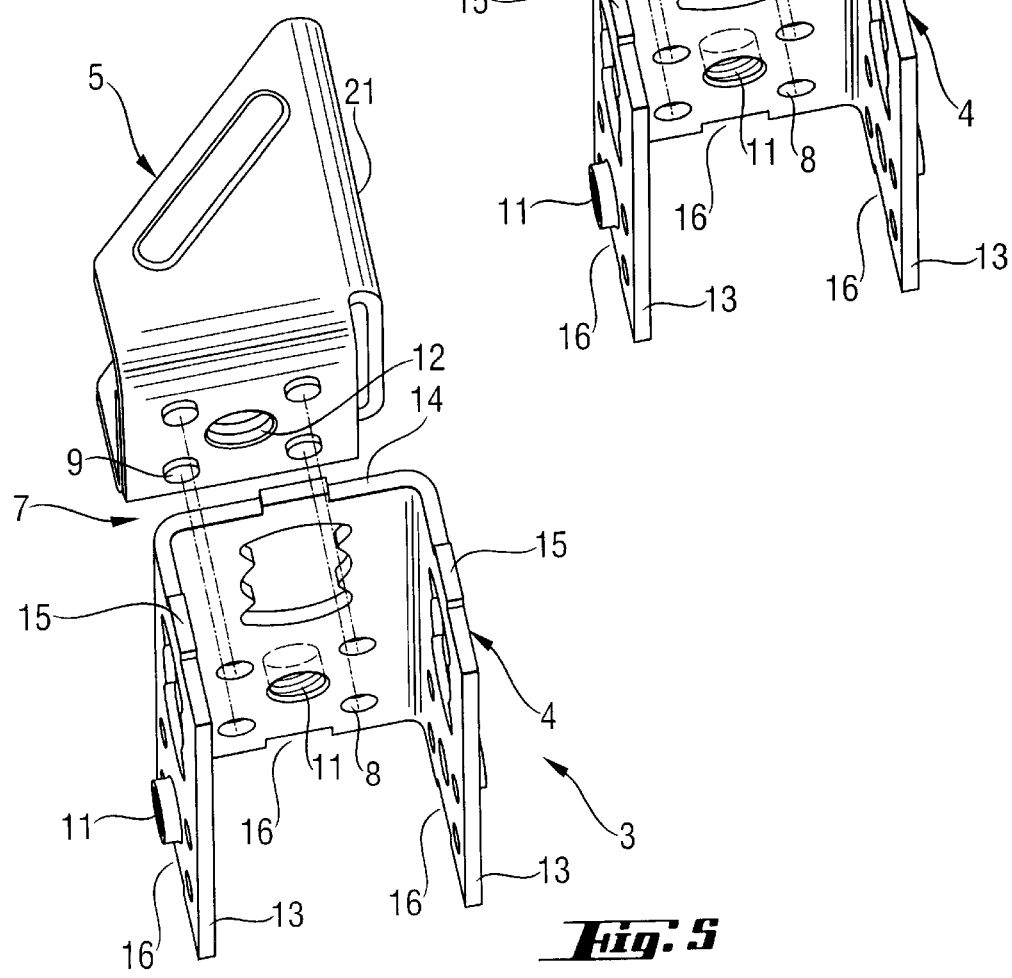

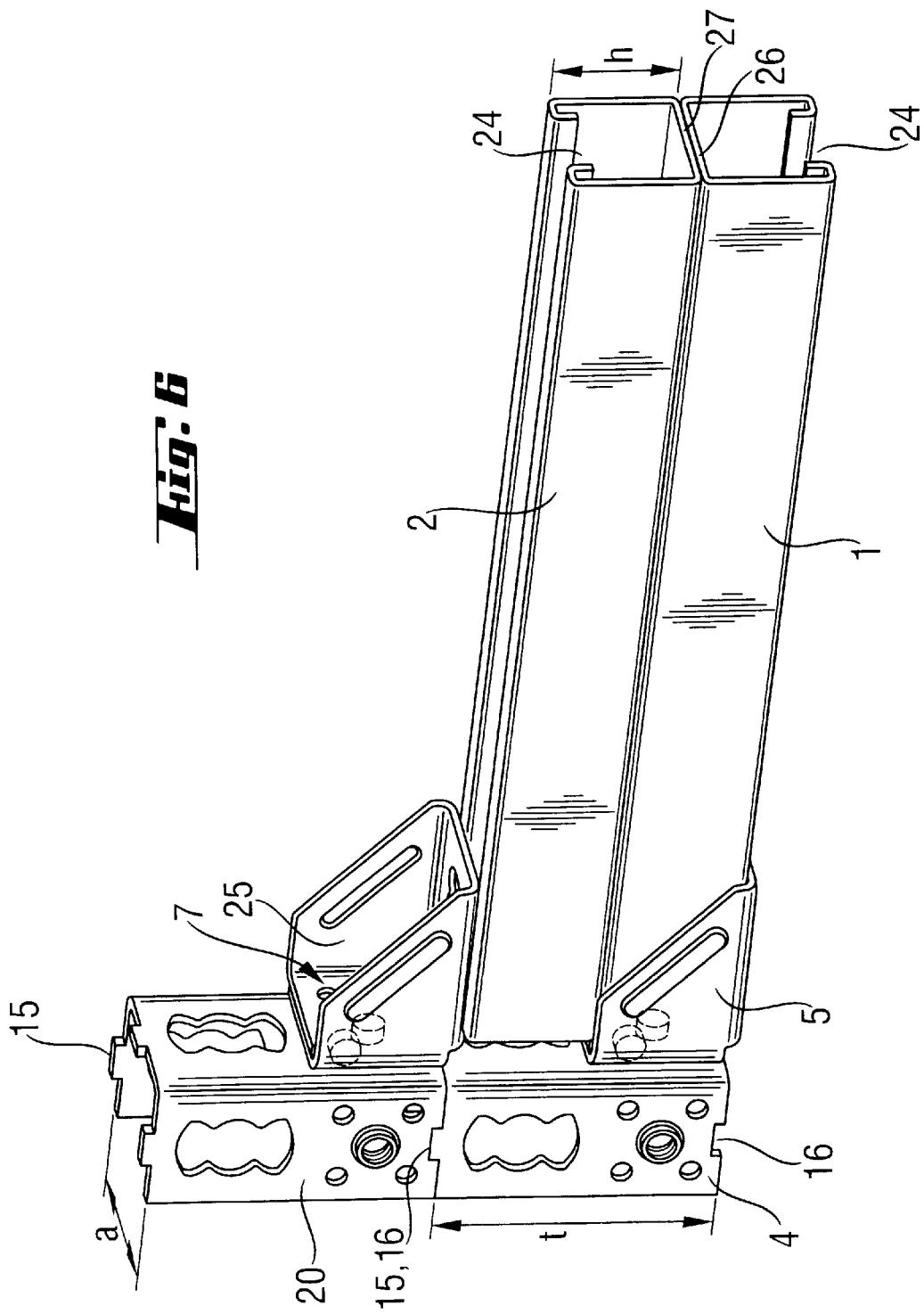

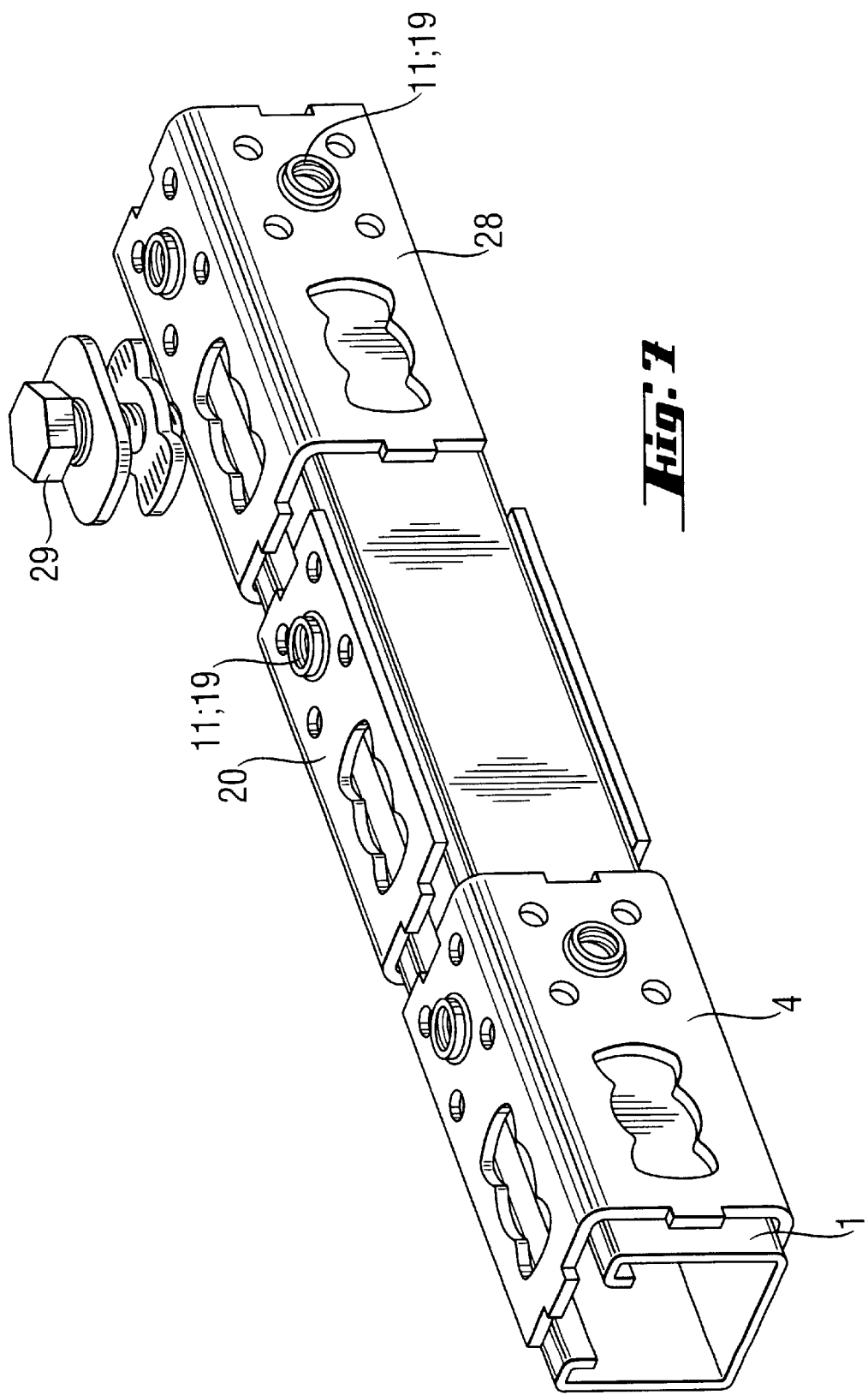

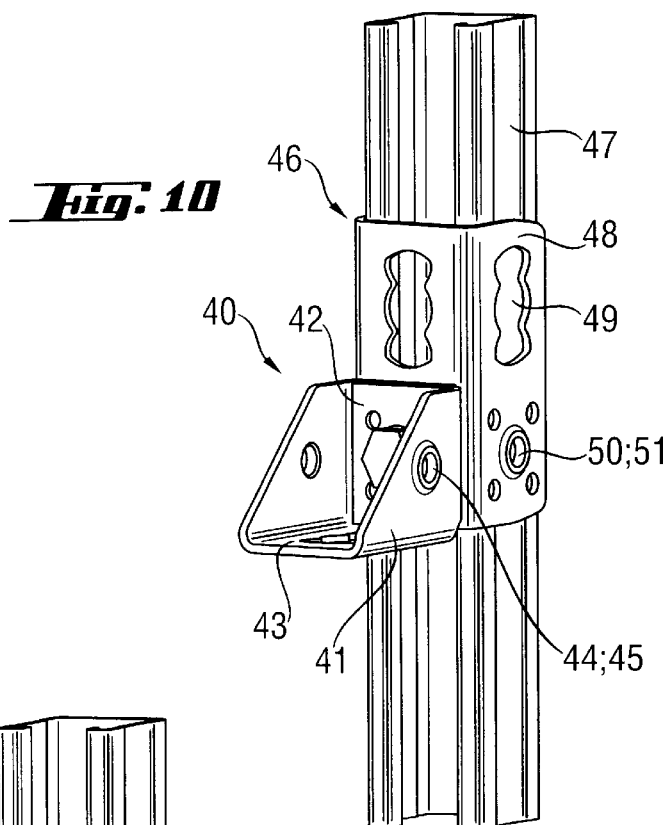
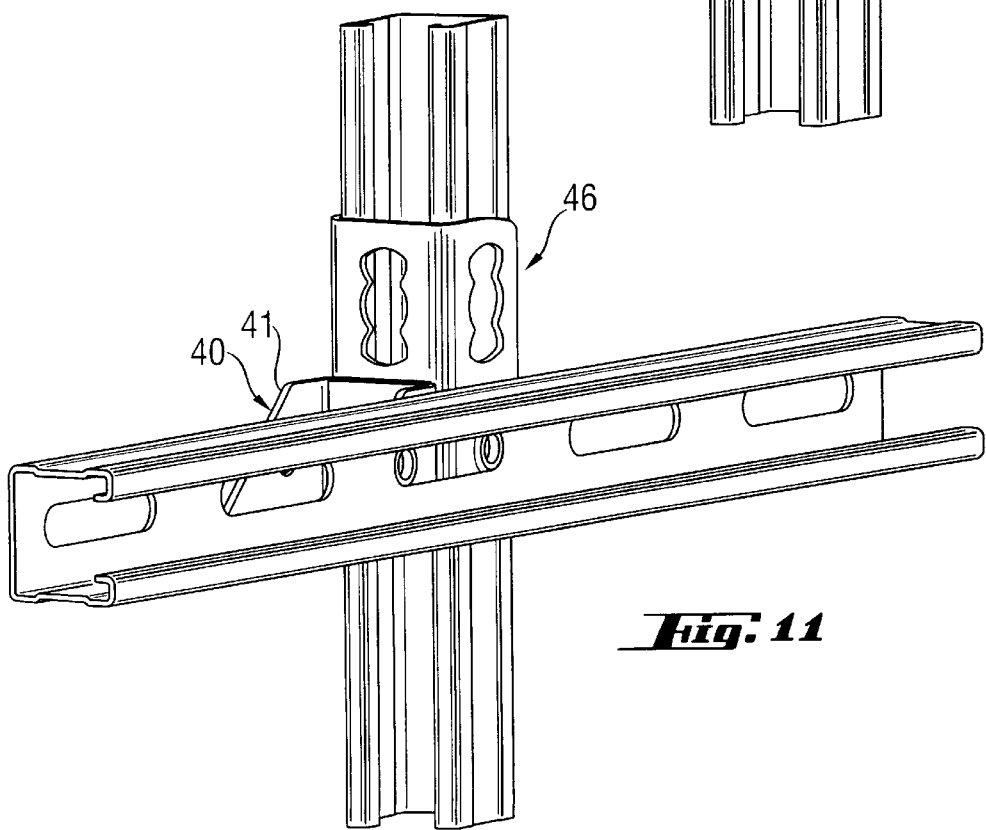

CONNECTION ELEMENT

BACKGROUND OF THE INVENTION

1. Field of the Invention

The present invention relates to a connection element for connecting mounting rails.

2. Description of the Prior Art

Connection elements for connecting mounting rails found a particular application in the pipe suspending systems. In order to suspend a pipe from a ceiling so that the pipe occupies a predetermined position, the mounting rails have to be connected with each other with sufficient flexibility. For flexibly connecting mounting rails with each other conventionally rail nuts with angles are used. An angle or angle element has a plurality of connection openings for attachment to a mounting rail at a predetermined position.

A drawback of using angle elements consists in that different angle elements need to be used for attachment of two or more rails at attachment point in different attachment positions. Therefore, a large number of different angle elements is required. This is associated with substantial expenses and a need in a large storage space. This is because a large number of angle elements should be stocked. Furthermore, the necessity to use different angle elements for attachment of mounting rails in different positions limits the mounting flexibility at a site when, e.g., a suspension system requires an angle element or a bend other than originally planned.

Accordingly, an object of the present invention is to provide a connection element for mounting rails suitable for different applications and which can be economically produced.

SUMMARY OF THE INVENTION

This and other objects of the present invention, which will become apparent hereinafter, are achieved by providing a connection element for at least two mounting rails and including a base member at least one attachment member having at least one connection opening, and connection means for reasleasably connecting the attachment member with the base member.

Because the connection element is formed as a modular element, a small number of parts is sufficient for forming a plurality of different connections. The base member is so formed that one or more attachment members can be secured thereto with the connection means. The connection means is formed as releasable means, permitting a correction of a position of the attachment member relative to the base member. The connection means, according to the present invention, significantly facilitate handling of the inventive connection element. This is because the positions of the members are predetermined. The connection means prevents rotation of the connected members relative to each other in their locked position. The manufacturing of the connection elements is significantly simplified in comparison with the prior art because instead of a number of different angle elements, only two parts for a connection element that provides for a plurality of different positions of the mounting rails should be produced. Storage is also significantly simplified. The invention connection element provides for more flexibility on a site.

According to the present invention, to facilitate the assembly of the connection element, the connection means includes a plurality of openings formed in the base or attachment member, a plurality of pegs provided on another of the base and attachment members and engaging in respective openings, and thread elements for fixedly connecting the base and attachment members together.

The openings in one of the member and the pegs on another member can be formed simply and economically. The number of openings and pegs determines the number of possible positions. The greater is the number the more positions of the attachment member relative to the base member can be obtained.

According to an advantageous embodiment of the present invention, the openings are formed in the base member, and there are provided at least four openings symmetrically arranged about a bore formed in the base member for receiving a thread element, e.g., a screw or a bolt. The pegs are provided on the attachment member and include at least four pegs symmetrically arranged about a bore formed in the attachment member through which the thread element extends. With the above-described embodiment, there are provided four positions of the attachment member relative to the base member offset relative to each other by 90°. The central arrangement of the bore for the locking element of the connection means insures a uniform engagement of the pegs in respective openings and a uniform distribution of a load in the connection means. The bores are formed transverse to a longitudinal extent of the respective members, providing for a number of positions of the attachment and base members relative to each other.

Advantageously, the base member has two side walls and a connection or bottom wall that connects two side wall, whereby a U-shaped profile is formed. The U-shaped profile insures an easy manufacture of the base member and its reliable attachment on mounting rail, without a possibility of rotation relative thereto.

According to the present invention, the base member is provided, on one of its end surfaces, with a web and, on another of its end surfaces, with a pocket complementary to the web. The webs and the pockets insure that a row of base members can be formed by connection of several base members with each other, with the web of one base member engaging in the pocket of another base member.

Advantageously, the central bore formed in the base member has an inner thread which forms part of the thread means that provides for a fixed connection between the attachment and base members. Naturally, the inner thread can be provided in the central bore of the attachment member. However, from the economical point of view, it is preferable to provide the bore of the base member with the inner thread as, generally, a greater number of attachment members than of base members is produced.

According to a particularly advantageous embodiment of the present invention, the attachment member is formed of mutually perpendicular attachment plate and a connection plate. The connection opening is formed in the attachment plate and the pegs are provided on the connection plate.

Preferably, the connection plate is formed as a square plate, with the bore being formed in the center of the plate, and with the length of a side of the plate corresponding somewhat to the height of a mounting rail. This shape of the connection plate insures that it can be easily secured to the base member in any of four, offset relative to each other by 90°, positions. While, preferably, the angle between the connection and attachment plates is a right angle, it can be arbitrary changed, dependent on the requirements to a particular connection element. For some applications, it may be advantageous to form the connection plate as a circular plate.

According to the present invention, preferably, the side wall of the base member is formed as a rectangular wall having a width corresponding to a double of a height of an attachable mounting rail and to a double of distance between the side walls. This insures that the connection element can be used for connecting two mounting rails, with the rail openings facing each other or facing away from each other.

An economic manufacturing is insured when the attachment and base members are formed as stamped bent parts.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 4 a perspective view, at an increased scale, of the connection element shown in FIG. 1;

FIG. 5 a perspective view of the connection element shown in FIG. 4, with the attachment member being pivoted by 90°;

FIG. 6 a perspective view is illustrated one of the applications of a connection element according to the present;

FIG. 7 a perspective view showing a mounting rail with a plurality of base members of connection element according to the present invention;

FIG. 10 a perspective view of another embodiment of a connection element according to the present invention;

FIG. 11 a perspective view of the connection element shown in FIG. 10, but with the mounting rail being pivoted 90°;

DETAILED DESCRIPTION OF THE PREFERRED EMBODIMENTS

Figure 1:
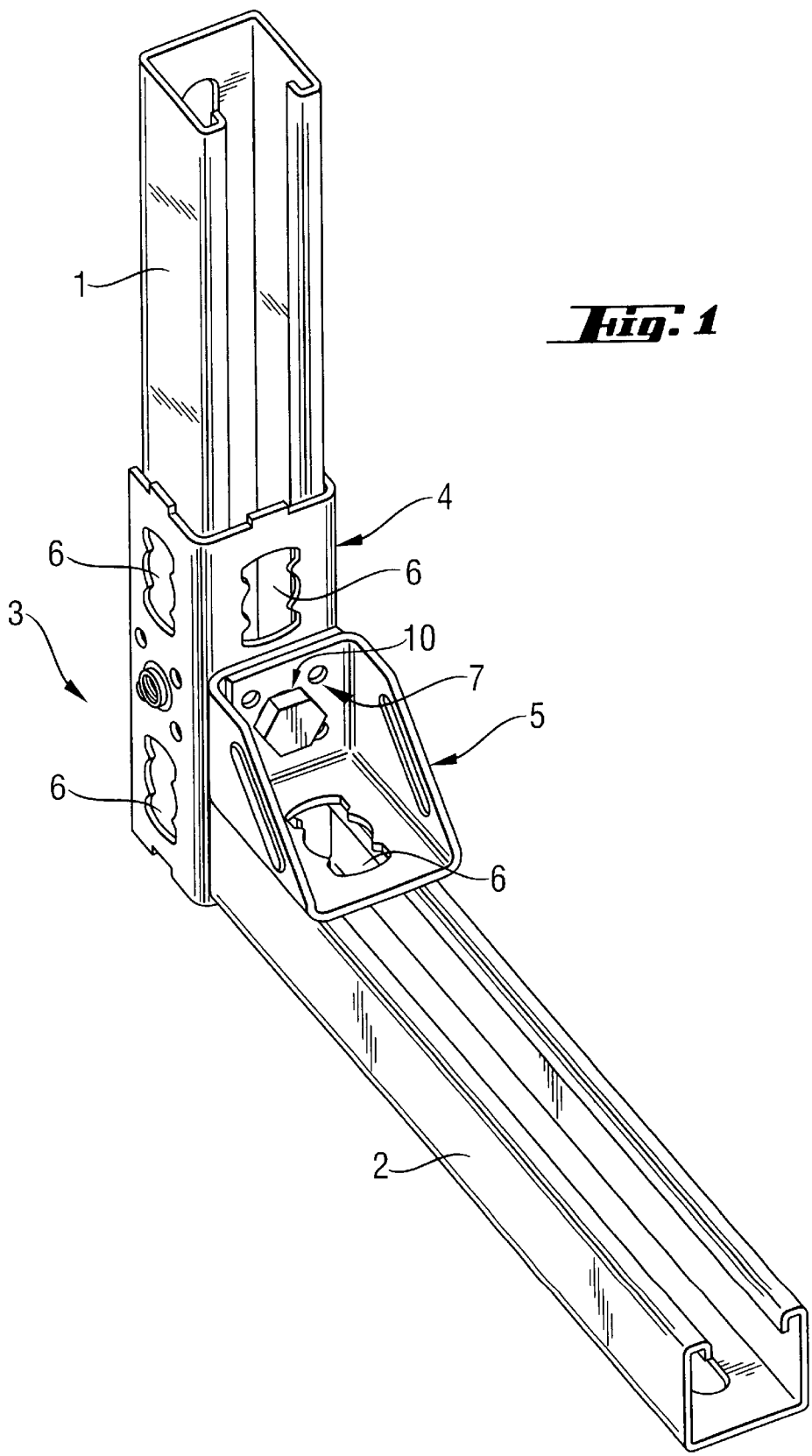
FIG. 1 a perspective view of a connection element according to the present invention.
Figure 2:
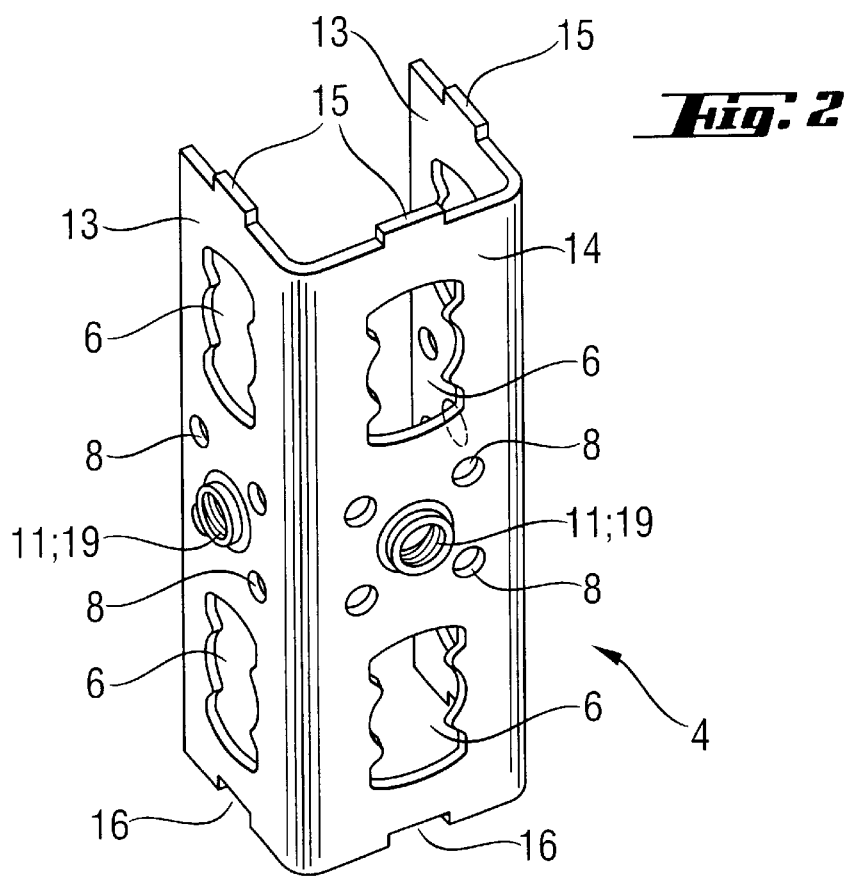
FIG. 2 a perspective view, at an increased scale, of a base member of the connection element shown in FIG. 1.
Figure 3:
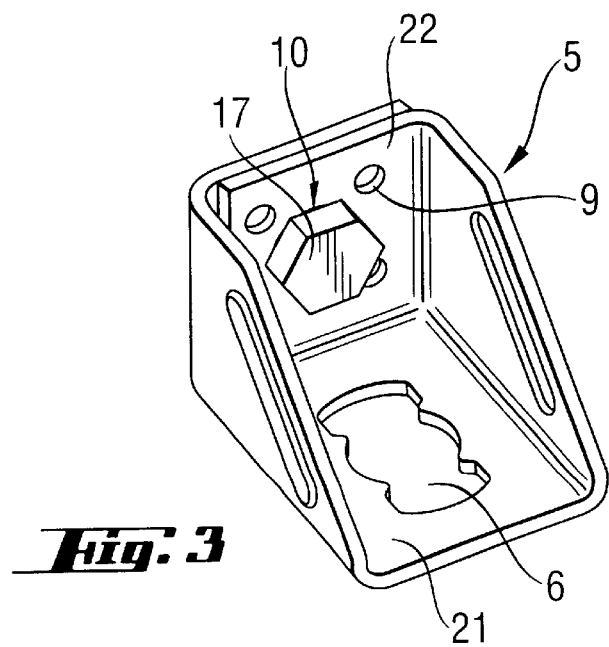
FIG. 3 a perspective view, at an increased scale, of an attachment member of the connection element shown in FIG. 1.

A connection element according to the present invention for connecting two mounting rails 1 and 2, which is shown in FIGS. 1–6, is designated generally with a reference numeral 3. The connection element 3 has a base member 4 and the attachment member 5. Each of the base member 4 and the attachment member 5 has at least one connection opening 6 for attachment of the respective members 4 and 5 to corresponding mounting rails 1 and 2. The attachment member 5 is releasably connected with the base member 4 by connection means 7, as it is particularly shown in FIG. 1.

The connection means 7 includes a plurality of openings 8, which are provided in one of the members 4 and 5, and a plurality of pegs 9 which are provided on another of the members 4 and 5 and which cooperate with the opening 8 for connecting the two members 4 and 5 together. The connection means 7 further includes thread means 10 for fixedly securing the base member 4 and the attachment member 5 together.

In the embodiment shown in FIGS. 1–6, the base member 4 has four openings 8 symmetrically arranged about a bore 11 for a bolt or a screw that forms part of the thread means 10. The attachment member 5 has four pegs 9 which are symmetrically arranged about a bore 12 and which engage in respective openings 8 as it is shown in FIGS. 4 and 5. The base member 4 has two, extending parallel to each other walls 13 and a bottom or connection wall 14, forming together a U-shaped profile. Each of the parallel walls 13 and the connection wall 14 has, a one of its free end surfaces, a web 15 and has, at another of its free end surfaces, a pocket 16 complementary to the web 15. The webs 15 and pockets 16 provide for a formlocking connection of a plurality of a base members 4 with each other, as it is shown in FIG. 6. Each of the walls 13 and 14 has the connection opening 6 and an element of the connection means 7. The thread means 10 includes a screw with a polygonal head 17. The screw cooperates with an inner thread 19 provided in the bore 11 for securing the attachment member 5 to the base member 4.

The attachment member 5 has an attachment plate 21 and a connection plate 22 extending transverse to the attachment plate 21. The connection opening 6 is formed in the attachment plate 21. The pegs 9 of the connection means 7 are provided on the connection plate 22.

As it is particularly shown in FIGS. 4 and 5, the base member 4 and the attachment member 5 can be pivoted relative to each other in their non-connected position. In the embodiment of FIGS. 1–6, the base member 4 and the attachment member 5 have four connection positions displaced by 90° to each other. Naturally instead of being attached to the connection wall 14 as it is shown in FIGS. 4–5, the attachment member 5 can be secured to one of the parallel walls 13. Further, several attachment member 5 can be secured to the base member 4.

FIG. 6 illustrates one of possible applications of a connection element according to the present invention. Each of the mounting rails 1 and 2 has a mounting opening 24 and are so arranged relative to each other that the mounting openings 24 face in opposite directions. Two base members 4 and 20 are formlockingly connected with each other, with the web 15 of the base member 4 engaging in the pocket 16 of the base member 20. Two attachment members 5 are secured to respective connection walls of the base members 4 and 20 with respective connection means 7. The attachment members 5 are secured to the mounting rails 1, 2 with respective rail nuts (not shown). The bottom 26, 27 of the rails 1, 2 about each other. To insure an appropriate mounting, the width (t) of the connection wall of the base member 5 should be equal to a double height (h) of the mounting rails 1 and 2 and be twice of the distance (a) between the parallel walls 13 of the base member 4, 20.

FIG. 7 shows a plurality of base members 4 secured on a mounting rail 1. The base members 4 are connected to the mounting rail 1 with respective rail nuts 29, one of which is shown before being inserted in the mounting opening of the base member 4.

Figure 8:
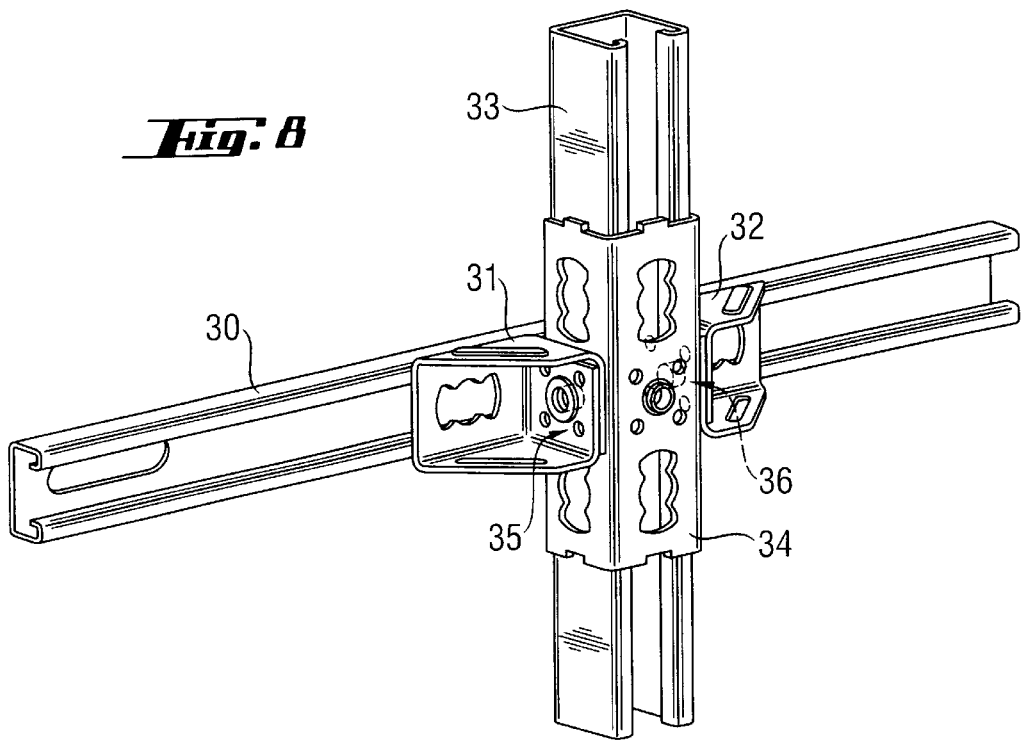
FIG. 8 a perspective view showing a connection element according to the present invention with a mounting rail passing therethrough.

For using the connection element according to the present invention with a passing-through rail, two attachment members 31, 32 are secured to a mounting rail 30 at a distance from each which corresponds to the width of a base member 34, as shown in FIG. 8. A further mounting rail 33 extends through the base member 34. The attachment members 31, 32 are secured to the parallel walls of the base member 34 with respective connection means 35, 36.

Figure 9:
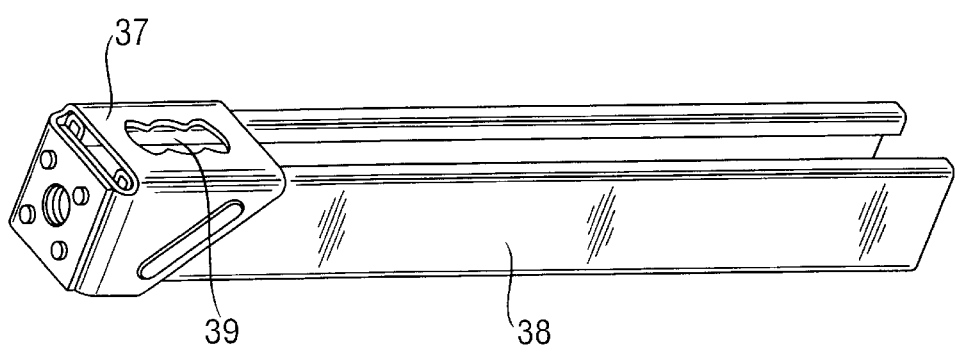
FIG. 9 a perspective view showing mounting of the attachment member of a connection element according to the present invention at an end of a mounting rail.

FIG. 9 illustrates another possibility of using an attachment member. In FIG. 9, an attachment member 37 is secured at the end of a mounting rail 38. The attachment member 37 is secured to the rail 38 with a rail nut (not shown) extendable through the connection openings 39.

The parts, which are shown in FIGS. 1–9, are formed of sheet metal as stamped bent parts.

FIGS. 10–13 shown another embodiment of an attachment member and its possible use. The shown attachment member 40 has, contrary to the attachment member 5 shown in FIG. 3, at least one bore 44 with an inner thread 45 and formed in a connection web 41 that connects mutually perpendicular connection plate 42 with attachment plate 43. The base member 46 connects the attachment member 40 with a mounting rail 47. The base member 46 has a side wall 48 with a connection opening 49 and a bore 50 with an inner thread 51. In order to be able to mount a second mounting rail 42 pivoted with respect to the first mounting 47 by 90°, as it is shown in FIG. 11, the side wall 48 of the base member 46 should lie in the same plane in which the connection web 41 of the attachment member 46 lies. At least the second mounting rail 52 has a plurality of elongate openings 53 equidistantly spaced from each other. The openings 53 are formed in the bottom 54 of the second mounting rail 52. The length of the elongate openings 53 should be so selected that each opening 53 encompasses both bores 44 and 45 formed in the connection web 41 of the attachment member 40 and the side wall 48 of the base member 46, respectively. For the sake of clarity, the connecting screw means is not shown.

Figure 12:
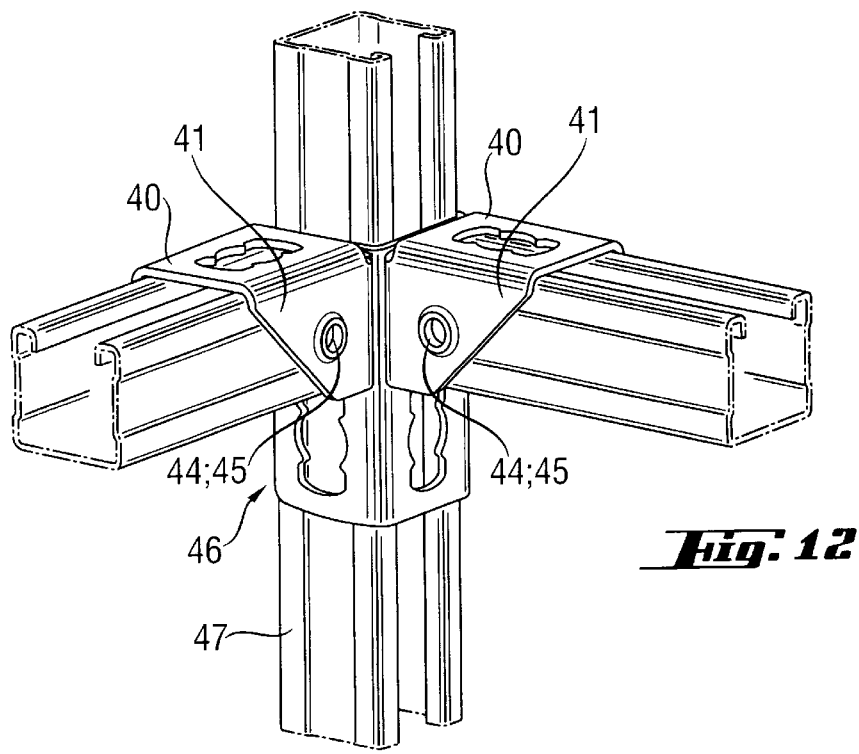
FIG. 12 a perspective view illustrating a possible use of the attachment member a connection element according to the present invention.
Figure 13:
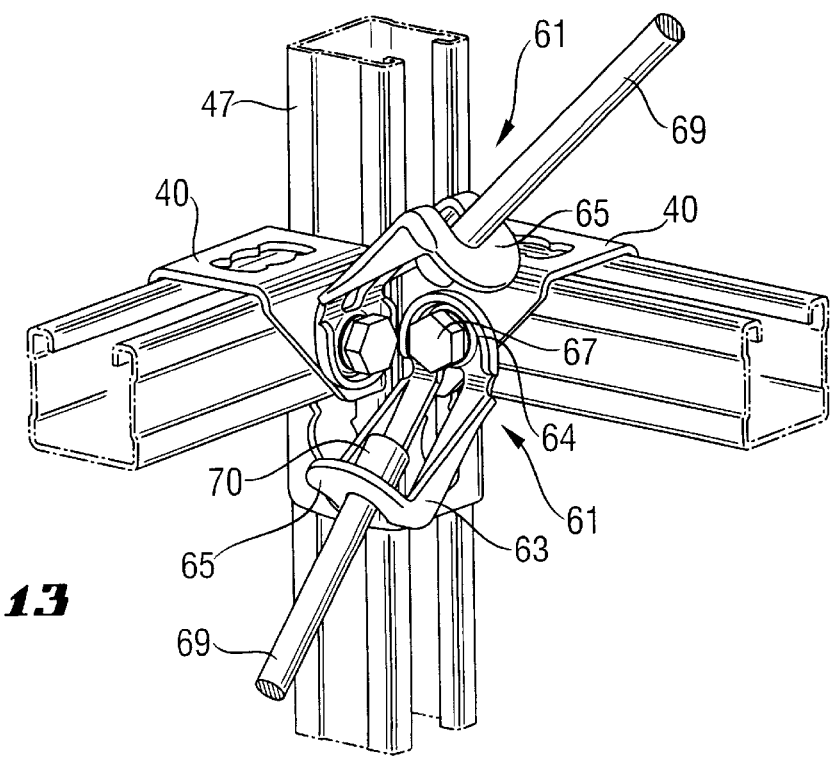
FIG. 13 a perspective view similar to that of FIG. 12 with two cross-braces.

FIGS. 12–13 illustrate a further application of the attachment member 40 as an attachment point for cross-braces designated generally with a reference numeral 61. The cross-brace 61 has a base plate 63 with two connection brackets 64, 65 provided at opposite longitudinal ends of the plate 63. The connection bracket 64, which is secured to the attachment member 40, has a bore 66 for receiving a screw 67. The opposite bracket 65 has a guide bore 68 for receiving an end of a brace bar 69. At its receivable end, the brace bar 69 has an engaging peg 70 the diameter of which is slightly larger than the diameter of the bar 69 and which formlockingly engages from behind in the guide bore 68. For insertion of the peg 70 in the guide bore 68, the base plate 63 of the brace 61 has an insertion opening 71 interconnected with the guide bore 68. A cross-brace 61 serves for receiving tension load acting within an installation system formed, e.g., by a plurality of mounting rails, e.g., rails 47 and 52.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A connection element for connecting at least two mounting rails (1, 2, 30, 33, 38), comprising:

a base member (4, 20, 28, 34) having at least one connection opening (6) for releasably connecting the base member (4, 20, 28, 34) with one of the at least two mounting rails (1, 2, 30, 33, 38);

at least one attachment member (5, 25, 31, 32, 37) having at least one connecting opening (6, 39) for releasably connecting the attachment member (5, 25, 31, 32, 37) with another of the at least two mounting rails (1, 2, 30, 33, 38);

at least two connection elements (29) extendable through the at least one connecting opening of the base member and the at least one connecting opening of the attachment member for connecting the base and attachment members, respectively, to each of the at least two mounting rails, and connection means (7, 35, 36) for releasably connecting the attachment member (5, 25, 31, 32, 37) with the base member (4, 20, 28, 34) in a plurality of arbitrary selected positions of the attachment member relative to the base member, wherein the connection means (7, 35, 36) comprises a plurality of openings (8) formed in one of the base and attachment members, a plurality of pegs (9) provided on another of the base and attachment members and engaging in the openings (8), and thread means (10) for fixedly connecting the base and attachment members together, and wherein the plurality of openings (8) is formed in the base member (4, 20, 28, 34) and consists of at least four openings symmetrically arranged about a bore (11) formed in the base member for receiving an element of the thread means (10), and the plurality of pegs (9) is provided on the attachment member (5, 31, 32, 37) and consists of at least four pegs (9) symmetrically arranged about a bore (12) formed in the attachment member for receiving the element of the thread means (10).

2. A connection element according to claim 1, wherein the base member (4, 20, 28, 34) has two side walls (13) and a connection wall (14) which forms, together with the side walls (13), a U-shaped profile.

3. A connection element according to claim 1, wherein the base member (4, 20, 28, 34) has on one of end surfaces thereof, at least one web (15) and has, on another of the end surfaces, a pocket (16) complementary to the web (15).

4. A connection element according to claim 1, wherein the bore (11) formed in the base member (4, 20, 28, 34) is provided with an inner thread (19).

5. A connection element according to claim 1, wherein the attachment member (5, 25, 31, 32, 37) has an attachment plate (21) and a connection plate (22) extending perpendicular to the attachment plate (21), and, wherein the connection opening (6) is formed in the attachment plate (21), and the pegs (9) are provided on the connection plate (22).

6. A connection element according to claim 2, wherein the side wall (13) is formed as a rectangular wall and has a width (t) corresponding to twice of a height (h) of the attachable mounting rail (1, 2) and twice of a distance (a) between the two side walls (3).

\* \* \* \* \*